W. BROWN.

GRATE FOR FURNACES.

No. 9,795. Reissued July 12, 1881.

Witnesses.

Arthur Reynolds

Bernice J. Noyes

Inventor.

William Brown, by Crosby & Gregory Attys.

N. PETERS. Photo-Lithographer. Washington, D. C.

UNITED STATES PATENT OFFICE.

WILLIAM BROWN, OF JERSEY CITY, NEW JERSEY.

GRATE FOR FURNACES.

SPECIFICATION forming part of Reissued Letters Patent No. 9,795, dated July 12, 1881.

Original No. 148,923, dated March 24, 1874. Application for reissue filed April 23, 1881.

*To all whom it may concern:*

Be it known that I, WILLIAM BROWN, of Jersey City, in the county of Hudson and State of New Jersey, have invented a new and useful Improvement in Grates for Furnaces and other Purposes; and I do hereby declare that the following is a full, clear, and exact description of the same, reference being had to the accompanying drawings, forming part of this specification, and in which—

Figure 2:
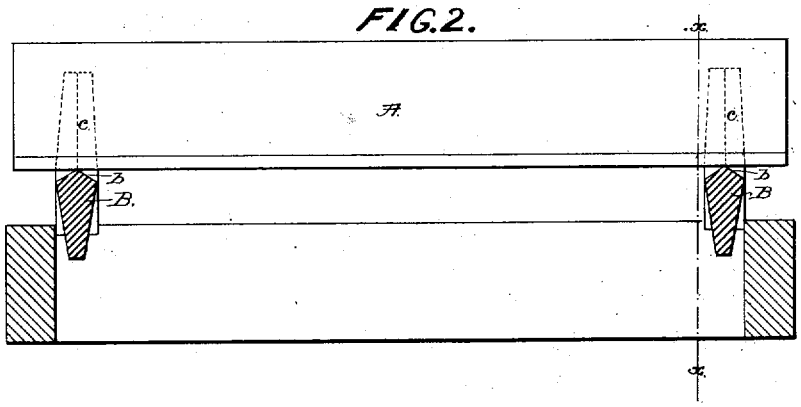
Figure 1:
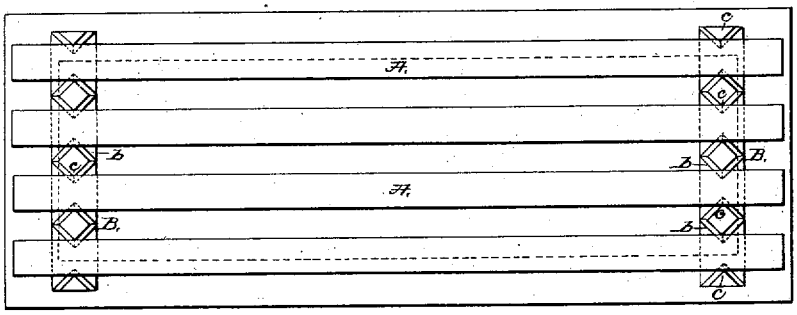
Figure 3:
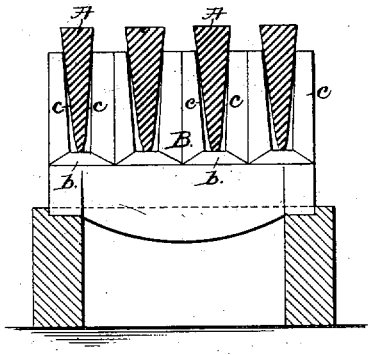

Figure 1 represents a plan of a grate constructed in accordance with my invention; Fig. 2, a vertical longitudinal section of the same, and Fig. 3 a transverse section thereof at the line *x x*.

Similar letters of reference indicate corresponding parts.

My invention generally consists in a novel construction of grate-bar and the supports or bearers for the bars of a grate, whereby a free and uninterrupted air-space is provided throughout the whole length of the bar and all around the latter, likewise every facility afforded for putting in and taking out a bar irrespective of its straight or warped condition.

Referring to the accompanying drawings, A A represent the bars of a grate, made straight in direction of their length, or, in other words, without side lugs or spacing-projections, the bars being arranged so that their top edges extend above the uprights *c* of the bearers B B, which latter support the bars placed between the uprights *c*, whereby a clear air-space is provided throughout the whole length of the bar. Said bars are of diminishing thickness in a downward direction, and the portions *b b* of the bearers on which they rest, and also the sides of the uprights *c c* of said bearers, between which the bars are slid or arranged and by which they are supported and spaced, are of such angular construction that they form mere edges where they come in contact with the bar, whereby provision is made for the passage of air all around the bars throughout their length—that is, within the bearers as well as outside of or beyond them—thus serving to keep the bars cool and favoring combustion. Grate-bars thus constructed and fitted to their places between upright portions of the bearers, between which they are placed and held loosely, may also be put in or taken out with the greatest facility, even though the bars should have become warped, and without withdrawing tie-bolts.

In the drawings the bars are represented as supported at or near their ends only; but in case of long bars intermediate bearers may be used.

The space between adjacent uprights is tapered and made narrower toward that part of the bearer on which the bars A rest, thus steadying the bars at their sides.

What is here claimed, and desired to be secured by Letters Patent, is—

1. The bearers provided with uprights to receive and space the grate-bars and hold them laterally against rocking movement, combined with the series of independent grate-bars placed and held loosely between the said uprights, and sustained by the bearers, substantially as described.

2. The independent tapered grate-bars, combined with the bearers provided with uprights, having between them tapered spaces for the reception loosely of the tapered grate-bars, which are supported at their lower edges directly upon the bearers, and are held laterally by the uprights to prevent rocking, substantially as described.

3. The bearers B and uprights of angular construction, located to bring their corner edges only in contact with the grate-bars, the bearer being reduced to form edges *b* to come in contact with the grate-bars, the projections being arranged to stop short of the top edges of the bars, in combination with the bars A, made flush on their sides and spaced by the projections of the bearers, essentially as shown and described.

WILLIAM BROWN.

Witnesses:
GEO. W. CASSEDY,
EDW. P. DEMOTT.